United States Patent
Dietrich et al.

(10) Patent No.: US 8,256,716 B2
(45) Date of Patent: Sep. 4, 2012

(54) AIRCRAFT FLIGHT TERMINATION SYSTEM AND METHOD

(75) Inventors: Mark C. Dietrich, Tucson, AZ (US); Charles N. Trepanier, Vail, AZ (US); Timothy R. Werch, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1305 days.

(21) Appl. No.: 12/112,047

(22) Filed: Apr. 30, 2008

(65) Prior Publication Data

US 2009/0272840 A1   Nov. 5, 2009

(51) Int. Cl.
*B64C 1/06* (2006.01)
(52) U.S. Cl. ....................................................... 244/131
(58) Field of Classification Search .................. 244/131, 244/3.15, 3.25
See application file for complete search history.

(56) References Cited

U.S. PATENT DOCUMENTS

| | | | |
|---|---|---|---|
| 2,973,164 A | 2/1961 | Grill | |
| 2,992,794 A * | 7/1961 | Boyd | 244/3.15 |
| 3,311,324 A | 3/1967 | Holt et al. | |
| 4,007,688 A | 2/1977 | Franz | |
| 5,009,374 A * | 4/1991 | Manfredi et al. | 244/1 R |
| 5,982,167 A | 11/1999 | Cirineo | |
| 6,621,456 B2 | 9/2003 | Ryken et al. | |
| 6,679,177 B1 | 1/2004 | Wu et al. | |
| 7,203,491 B2 | 4/2007 | Knoblach et al. | |

OTHER PUBLICATIONS

International Search Report and Written Opinion from corresponding International Application No. PCT/US09/34441.

* cited by examiner

*Primary Examiner* — Tien Dinh
*Assistant Examiner* — Valentina Xavier
(74) *Attorney, Agent, or Firm* — Renner, Otto, Boisselle & Sklar, LLP

(57) ABSTRACT

An aircraft has a flight termination system that allows flight of an unmanned aircraft to be quickly and efficiently terminated. The flight termination system separates one of the control surfaces of the aircraft, such as a wing, from a fuselage of the aircraft, while one or more other control surfaces connected to the fuselage. The separation may be accomplished by firing one or more explosive bolts to release a clamp that connects the control surface to the fuselage. The separation causes an asymmetry in configuration that results in a rapid crash of the aircraft. The flight termination system causes termination to be effected in small flight footprint, without use of powerful explosives, and without a large cost in weight or volume. The flight termination system may be used in unpowered or powered aircraft.

13 Claims, 3 Drawing Sheets

AIRCRAFT FLIGHT TERMINATION SYSTEM AND METHOD

GOVERNMENT RIGHTS

This invention was made with government support under Government Contract FA8681-06-C-0152, SDB Increment II Risk Reduction. The government has certain rights in this invention.

BACKGROUND OF THE INVENTION

1. Technical Field of the Invention

The invention is in the field of flight termination systems for terminating aircraft flights.

2. Description of the Related Art

Prior flight termination systems have utilized highly explosive pyrotechnic charges to break an aircraft into pieces to interrupt flight. Other systems have disrupted flight using a combination of an aerodynamic disrupter such as an air brake, and control fin deflections. Powered flight systems have had flight terminated by cutting off fuel to a flight motor, or by detonating the fuel.

Improvements in the area of flight termination systems would be desirable.

SUMMARY OF THE INVENTION

A flight termination system for an aircraft accomplishes flight termination by shearing off a wing or other control surface of the aircraft. A pair of explosive nuts are part of a clamp that initially holds the wing within a notch in the fuselage of the aircraft. Firing of one or both of the nuts opens a cover that holds the wing to the fuselage. Aerodynamic forces on the cover and/or the wing separate the wing from the fuselage. This leads to rapid termination of flight, due at least in part to the asymmetry in aerodynamic forces caused by separating one of the wings. The flight termination is accomplished in an easily analyzable manner, and within a relatively small, well defined footprint. The explosive nuts used to separate the wing provide redundancy of operation, and use explosives that present only a minor explosion hazard. This makes for safer handling and easier qualification of the flight termination system.

According to an aspect of the invention, a flight termination system shears off one or more control surfaces of an aircraft.

According to another aspect of the invention, a method of flight termination includes shearing off a control surface, such as a wing, of an aircraft.

According to still another aspect of the invention, a flight termination system shears off a wing or other control surface of an aircraft, thus creating asymmetric aerodynamic forces on the aircraft.

According to a further aspect of the invention, a method of flight termination includes removing at least part of the control surface of the aircraft to thereby create asymmetric aerodynamic forces on the aircraft.

According to a still further aspect of the invention, a flight termination system includes use of multiple explosive nuts to provide redundancy and a mechanism for disconnecting a wing or other control surface from a fuselage.

According to another aspect of the invention, an aircraft includes: a fuselage; multiple control surfaces coupled to the fuselage; and a flight termination system configured to separate one or more of the control surfaces from the fuselage, while leaving at least one other of the control surfaces coupled to the fuselage.

According to yet another aspect of the invention, a method of terminating flight of an aircraft includes the steps of: separating a first control surface of the aircraft from a fuselage of the aircraft, while maintaining a second control surface of the aircraft coupled to the fuselage; and after separating the first control surface from the fuselage, crashing the aircraft.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

An aircraft has a flight termination system that allows flight of an unmanned aircraft to be quickly and efficiently terminated. The flight termination system separates one of the control surfaces of the aircraft, such as a wing, from a fuselage of the aircraft, while one or more other control surfaces connected to the fuselage. The separation may be accomplished by firing one or more explosive bolts to release a clamp that connects the control surface to the fuselage. The separation causes an asymmetry in configuration that results in a rapid crash of the aircraft. The flight termination system causes termination to be effected in small flight footprint, without use of powerful explosives, and without a large cost in weight or volume. The flight termination system may be used in unpowered or powered aircraft, but is particularly useful in winged glide aircraft where no fuel supply can either be cut off or detonated to cause flight termination.

Figure 1:
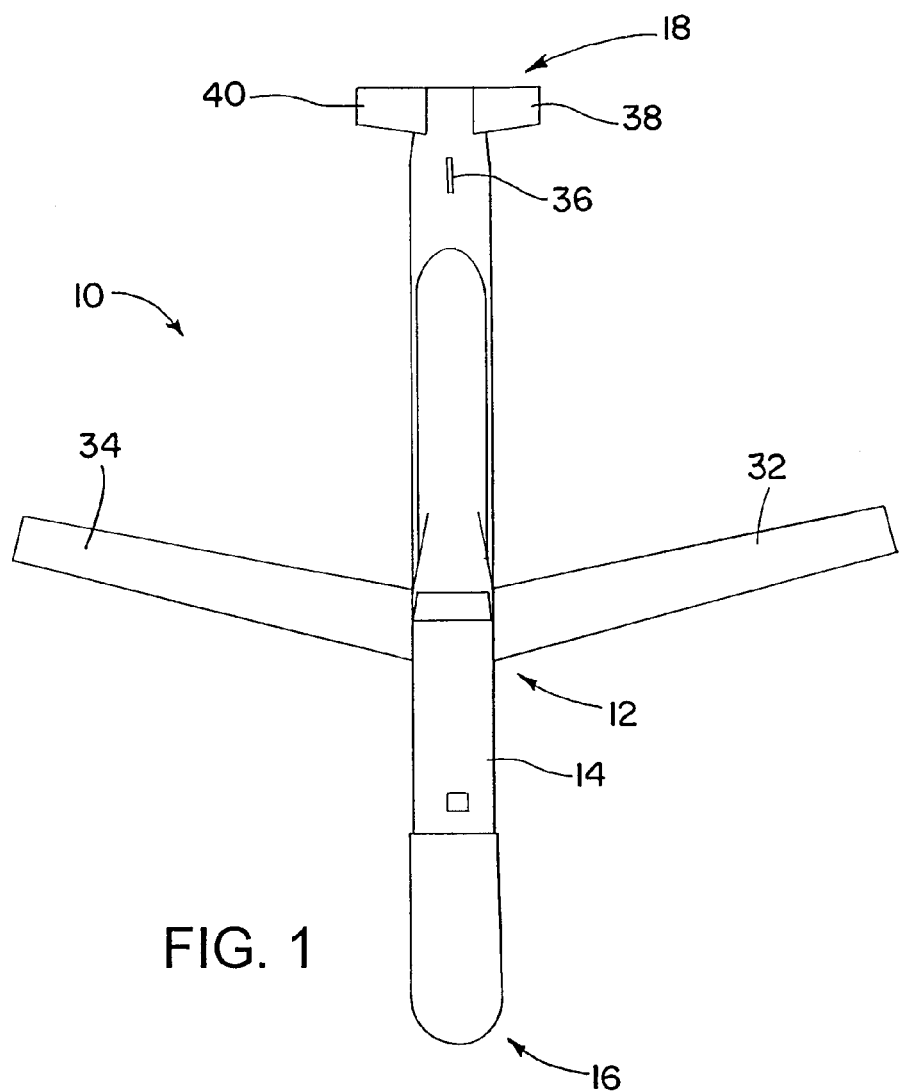
FIG. 1 is a plan view of an aircraft with a flight termination system in accordance with an embodiment of the present invention.

FIG. 1 shows an aircraft 10 that includes a flight termination system 12 for terminating flight of the aircraft 10. The aircraft 10 may be a weapon system, such as a missile, or may be another type of unmanned aircraft. The aircraft 10 may be an unpowered aircraft that glides in flight, and has no propulsion system, for example having no engine or rocket motor. Alternatively, the aircraft 10 may be a powered aircraft with its own propulsion system, such as a jet engine or a solid rocker motor.

The aircraft has a fuselage 14 with a front end 16 and a back end 18. Multiple control surfaces 20 are mechanically coupled to the fuselage 14 in order to maintain lift of the aircraft 10, and/or to direct the aircraft 10 in a desired direction and/or to a desired location. The control surfaces 20 in the illustrated embodiment include wings 32 and 34, a rudder 36, and fins 38 and 40. It also will be appreciated that some or all of the control surfaces 20, or parts of the control surfaces 20 may be selectively actuatable to selectively control a flight direction or other flight characteristics of the aircraft 10. It will be appreciated that such control may be accomplished in any of a wide variety of ways. Control surfaces may be selectively tilted or articulated, flaps of a control surface may be tilted or extended/retracted, or the shape of the control surface may be warped. These are only a few examples of possible ways that the control surfaces 20 may be selectively configured to set or alter course of the aircraft 10.

It will be appreciated that other types of control surfaces may be utilized to help maintain flight and/or control direction of the aircraft 10. Canards are an example of another type of control surface.

Figure 2:
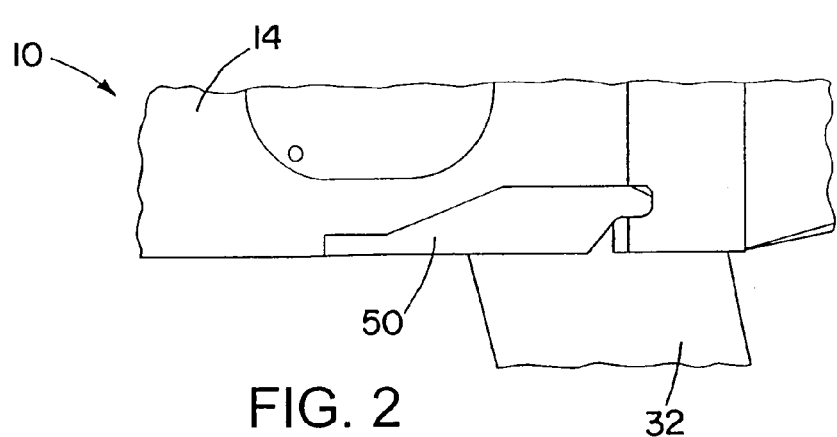
FIG. 2 is a plan view of part of the aircraft of FIG. 1, focusing on the flight termination system.
Figure 3:
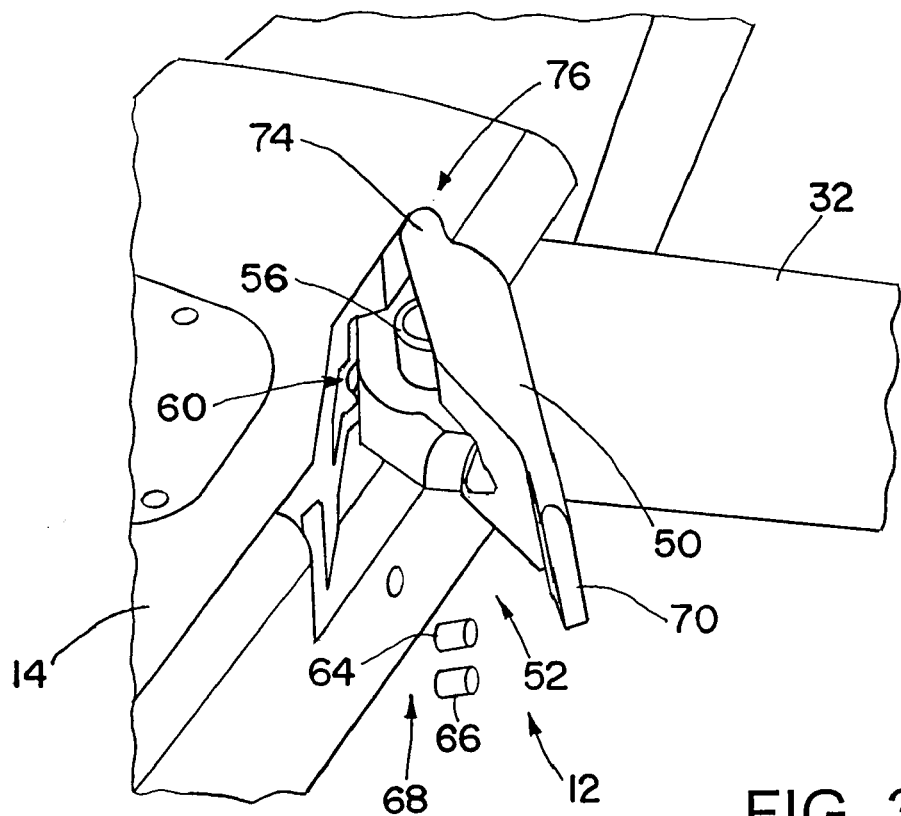
FIG. 3 is an oblique view of a portion of the aircraft of FIG. 1, showing details of the flight termination system.
Figure 4:
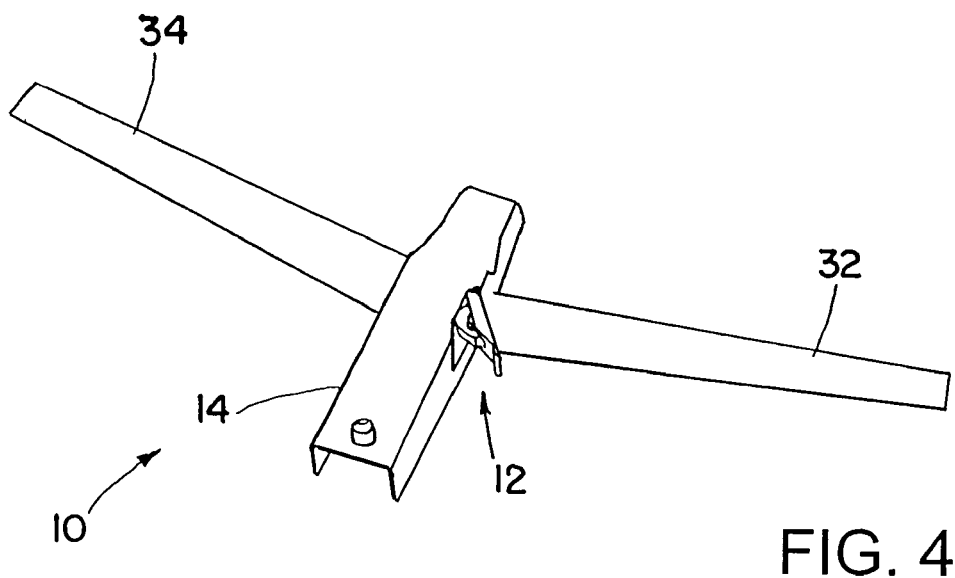
FIG. 4 is an oblique view of parts of the aircraft of FIG. 1, illustrating the separation process for separating a wing from the fuselage of the aircraft.

With reference now in addition to FIGS. 2 and 3, the flight termination system 12 is used to disconnect one or more of the control surfaces 20 from the fuselage 14. In the illustrated embodiment aircraft 10 the flight termination system 12 is used to sever the wing 32 from the fuselage 14. This severing, shearing or disconnecting of the wing 32 causes asymmetry in the aerodynamic characteristics of the aircraft 10, leading to a rapid crash of the aircraft 10. It will be appreciated that unstable flight regimes leading to rapid crashing may be accomplished by removal of one or more of the other of the control surfaces 20.

The flight termination system 12 includes a cover 50. The cover 50 initially maintains coupling between the wing 32 and the fuselage 14. The cover 50 covers an opening or recess 52 in the fuselage 14. A wing pivot pin 56 is located in the opening or recess 52, initially within a slot or notch 60. The cover 50 in its closed configuration the cover 50 holds the pivot pin 56 in place within the fuselage slot 60. The end of the wing 32 is wedged between the cover 50 and the fuselage 14. In this configuration, shown in FIG. 2, the cover 50 is flush with the fuselage 14.

The flight termination system 12 includes a pair of explosive bolts 64 and 66 to release a clamp 68 that holds a front end 70 of the cover 50 against the fuselage 14. The cover 50 includes a back end cover pivot protrusion 74, which fits into a corresponding notch 76 in the fuselage 14. Initiation of one or both of the explosive bolts 64 and 66 causes the clamp 68 to release. This allows the front end 70 of the cover 50 to move outward away from the fuselage, with the cover pivoting at the back end cover pivot protrusion 74. The initiation of this process moves the cover forward end 70 into the air stream surrounding the fuselage 14. Aerodynamic drag forces accelerate and complete the process of rotating the cover forward end 70 further outward. The combined action of the explosive bolts 64 and 66 and aerodynamic forces thus open the cover 50 and maintain the cover 50 in an open position.

The opening of the cover 50 allows disengagement of the wing 32 from the fuselage 14. With the cover 50 open the pivot pin 56 of the wing 32 is no longer constrained within the slot 60 and the fuselage 14. Wing loads on the pivot pin 56 also serve to pull the cover 50 outward, away from the fuselage 14. With the cover 50 open the pivot pin 56 disengages from the slot 60. This releases the wing 32 from the fuselage 14 and causes the wing 32 to fall away from the rest of the aircraft 10. Separation of the wing 32 and the fuselage 14 causes an asymmetry in the flight characteristics of the aircraft 10. The unstable asymmetric uncontrolled flight produced by the sudden removal of the wing 32 very quickly results in a crash of the aircraft 10. This results in a much smaller footprint of possible crash locations than with other possible flight termination methods.

The various parts of the aircraft 10 may be made of any of a variety of suitable materials. For example the fuselage 14 may be made of aluminum, and the cover 50 may be made of steel.

Figure 5:
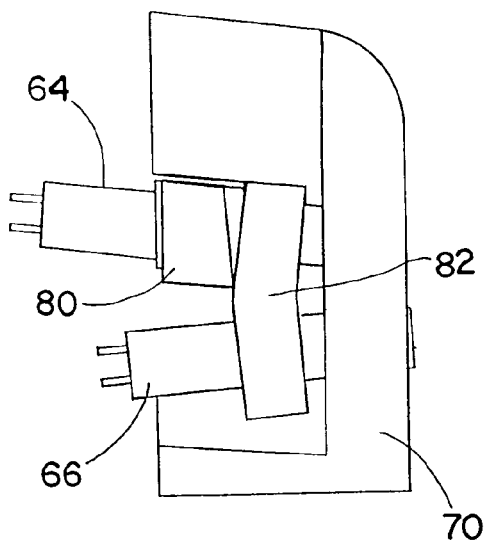
FIG. 5 is an end view showing a clamp configuration as part of the flight termination system of FIG. 1.
Figure 6:
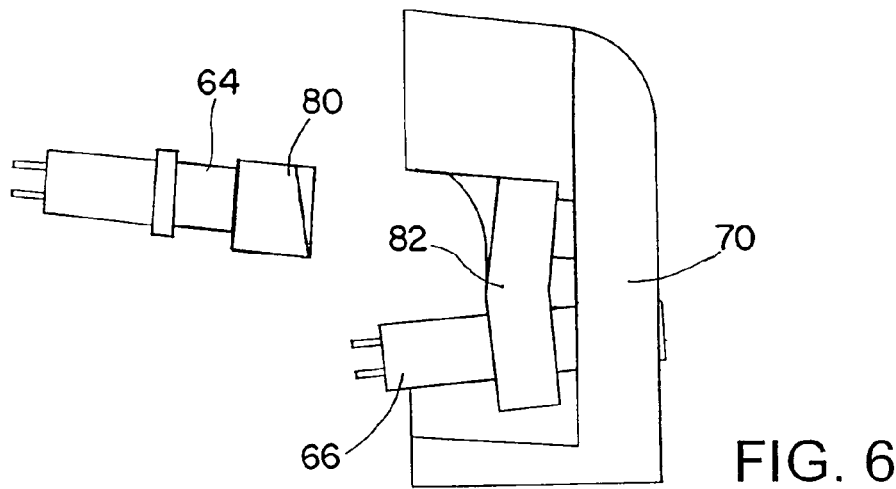
FIG. 6 is an end view that illustrates one mode of separation of the clamp of FIG. 5, using a first explosive nut.
Figure 7:
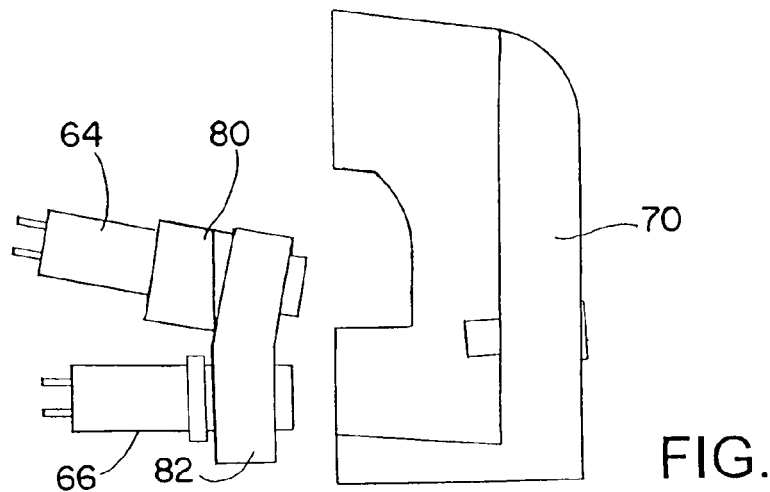
FIG. 7 is an end view illustrating a second mode of separation of the clamp of FIG. 5, using a second explosive nut.

FIGS. 5-7 illustrate further details of the installation and operation of the explosive bolts 64 and 66. The explosive bolts 64 and 66 utilize low-level explosives with a minor explosive hazard. These explosives are used to separate parts of the explosive bolts, thereby severing the mechanical connection of two parts initially held together by each of the explosive bolts 64 and 66. Suitable explosive bolts for this purpose are explosive nuts available from Pacific Scientific Energetic Materials Co., of Chandler, Ariz. Such bolts utilize a low-level explosive to separate parts of the explosive nuts. The explosive utilized is a Class 1.4 explosive, as is defined in 49 Code of Federal Regulations (CFR) 173.50, which should be considered as incorporated by reference herein. As stated in 49 CFR 173.50(b)(4), Class 1.4 explosives consist of explosives that present a minor explosion hazard. The explosive effects of such explosives are largely confined to the package containing such an explosive, and no projection of fragments of appreciable size or range is to be expected. An external fire does not cause any virtually instantaneous explosion of the entire contents of a package containing such an explosive.

The bolts 64 and 66 are configured for redundant operation, such that firing either or both of the bolts 64 and 66 will cause release of the clamp 68, opening of the cover 50. The first explosive nut 64 couples together a fuselage part 80 and an intermediate member 82 of the clamp 68. The second explosive nut 66 couples together the intermediate part 82 and the end 70 of the cover 50.

Firing the first explosive bolt 64, illustrated in FIG. 6, causes separation of the fuselage part 80 from the intermediate member 82 in the cover 50. This releases the clamp 68 and allows the cover 50 to pivot and open.

Firing of only the second explosive bolt 66, illustrated in FIG. 7, severs the mechanical connection between the intermediate member 82 and the cover 50. Again this releases the clamp 68 and allows pivoting and opening of the cover 50.

The intermediate member 82 may be made of metal or another suitable material. Suitable holes in the fuselage part 80, the intermediate member 82, and the cover 50 may be used to receive the explosive nuts or bolts 64 and 66.

The flight termination system 12 may be armed by any of a variety of suitable mechanisms. For instance, the system 12 may be armed by a combination of signals, for example by umbilical release and wing deployment initiation.

The aircraft 10 may have a communication system for receiving signals from the ground or from another vehicle to allow selectively firing of the explosive bolts 64 and 66 at a desired time. Alternatively the explosive bolts 64 and 66 may be set to fire at a certain time during flight, or upon the occurrence of some predetermined event that is sensed by the aircraft 10. For example the flight termination system 12 may be configured to activate and fire the explosive bolts 64 and 66 when a predetermined air speed or acceleration is reached.

It is expected that activation of the flight termination system 12 will involve the simultaneous or near-simultaneous firing of both of the bolts 64 and 66. The bolts 64 and 66 provide redundancy in the operation of the flight termination system 12, such that if either of the bolts 64 and 66 fires, the clamp 68 is released and the front cover end 70 is disconnected from the fuselage 14, allowing a control surface such as the wing 32 to separate from the fuselage 14. Termination of the flight quickly follows.

The flight termination system 12 provides many advantages relative to other prior methods of accomplishing flight termination of an aircraft. The redundancy in the flight termination system 12 provides a high degree of reliability. The redundancy of the flight termination system 12 provides the safety system robustness required in flight test ranges.

Another advantage is that only a small amount of explosive is required to achieve flight termination. Furthermore, the explosive required can be a safer class of explosives that presents only a minor explosive hazard. Higher class, more hazardous explosives, such as Class 1.1 explosives (as defined in 49 CFR 173.50), have been used in prior systems. Such explosives have a mass explosion hazard which affects almost the entire load of explosives instantaneously. It will be appreciated that such explosives require far more careful handling than less dangerous explosives, such as the Class 1.4 explosives utilized in the explosive bolts 64 and 66. Therefore, the flight termination system such as described herein provides less of a hazard, and requires less stringent handling requirements.

A further advantage is that no software is required for operation of the flight termination system 12. Software is required as part of the flight termination process that involves movement of the rudder and/or other control surfaces, for example by fully deflecting the rudder over in one direction. In such a process software position commands are sent to control actuators that control the position of fins or other movable parts of control surfaces.

Flight termination systems such as those described herein also have the advantage of providing a smaller footprint of possible crash locations then is achieved in prior systems. Flight termination is easily modeled since the loss of lift due to wing release or to remove of another control surface may be easily analyzed and more universally accepted by a safety committee, than flight termination by other mechanisms, such as by use of an explosive or by movement of control surfaces such as a rudder.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An aircraft comprising:
   a fuselage;
   multiple control surfaces coupled to the fuselage; and
   a flight termination system configured to separate one or more of the control surfaces from the fuselage, while leaving at least one other of the control surfaces coupled to the fuselage;
   wherein the flight termination system includes one or more explosive nuts that are fired to separate the one or more control surfaces from the fuselage by allowing release of a control surface in from the fuselage; and
   wherein the one or more explosive nuts are part of a clamp that holds a cover in a closed position, against the fuselage;
   wherein the cover, when in the closed position, holds the control surface pin in a notch in the fuselage.

2. The aircraft of claim 1, wherein the one or more explosive nuts includes:
   a first explosive nut that separably couples the fuselage to an intermediate member of the clamp; and
   a second explosive nut that separably couples the intermediate member to the cover.

3. The aircraft of claim 1, wherein firing the one or more explosive nuts releases the clamp and opens the cover, allowing the one or more control surfaces to be sheared away from the fuselage.

4. The aircraft of claim 1, wherein explosives used in the one or more explosive nuts have a minor explosive hazard.

5. The aircraft of claim 1, wherein explosives used in the one or more explosive nuts are a Class 1.4 explosive, as defined in 49 CFR 173.50.

6. The aircraft of claim 1, wherein the aircraft is an unpowered glider with no fuel supply.

7. The aircraft of claim 1, wherein separating the one or more control surfaces from the fuselage makes the aircraft aerodynamically asymmetric.

8. A method of terminating flight of an aircraft, the method comprising:
   separating a first control surface of the aircraft from a fuselage of the aircraft, while maintaining a second control surface of the aircraft coupled to the fuselage; and
   after separating the first control surface from the fuselage, crashing the aircraft;
   wherein the separating includes firing one or more explosive nuts of a clamp that holds a pin of the first control surface mechanically coupled to the fuselage; and
   wherein the firing the one or more explosive nuts opens a cover that, when opened, allows a pivot pin of the first control surface to disengage from a notch in the fuselage.

9. The method of claim 8, wherein the separating includes shearing the first control surface away from the fuselage.

10. The method of claim 8, wherein the first control surface and the second control surface are both wings of the aircraft.

11. The method of claim 8, wherein the clamp includes multiple of the explosive nuts, the firing of any of which will be sufficient to release the clamp.

12. The method of claim 8, wherein the crashing includes unstably flying the aircraft prior to impact.

13. The aircraft of claim 1,
   wherein the multiple control surfaces includes a pair of wings;
   wherein the one or more control surfaces to be separated from the fuselage includes one of the wings; and
   wherein the at least one other control surface includes the other of the wings.

* * * * *